(12) United States Patent
Ing et al.

(10) Patent No.: US 8,313,206 B2
(45) Date of Patent: Nov. 20, 2012

(54) LIGHTING DEVICE

(76) Inventors: Wen-Chiun Ing, Xindian (TW);
Wei-Hsin Hou, Taipei (TW)

(*) Notice: Subject to any disclaimer, the term of this patent is extended or adjusted under 35 U.S.C. 154(b) by 211 days.

(21) Appl. No.: 12/963,674

(22) Filed: Dec. 9, 2010

(65) Prior Publication Data

US 2011/0141746 A1    Jun. 16, 2011

Related U.S. Application Data

(60) Provisional application No. 61/286,448, filed on Dec. 15, 2009.

(51) Int. Cl.
*G09F 13/04* (2006.01)

(52) U.S. Cl. ........................... 362/97.3; 362/800

(58) Field of Classification Search ............... 362/231, 362/555, 561, 558, 97.1–97.4, 800, 311.01–311.15
See application file for complete search history.

(56) References Cited

U.S. PATENT DOCUMENTS

| 7,213,937 B2* | 5/2007 | Tsai | 362/224 |
| 7,843,528 B2* | 11/2010 | Byoun et al. | 349/69 |
| 2008/0303757 A1* | 12/2008 | Ohkawa et al. | 345/82 |

\* cited by examiner

*Primary Examiner* — Jason Moon Han
*Assistant Examiner* — Jessica M Apenteng
(74) *Attorney, Agent, or Firm* — Bacon & Thomas, PLLC

(57) ABSTRACT

A lighting device and a method for manufacturing the lighting device are provided. The lighting device comprises a light source module and a plurality of light spreading plates. The light spreading plates are secured onto the light source module by stick objects which are sheathed with hollow caps. The lighting device provides uniform surface light within an ultra thin configuration.

26 Claims, 20 Drawing Sheets

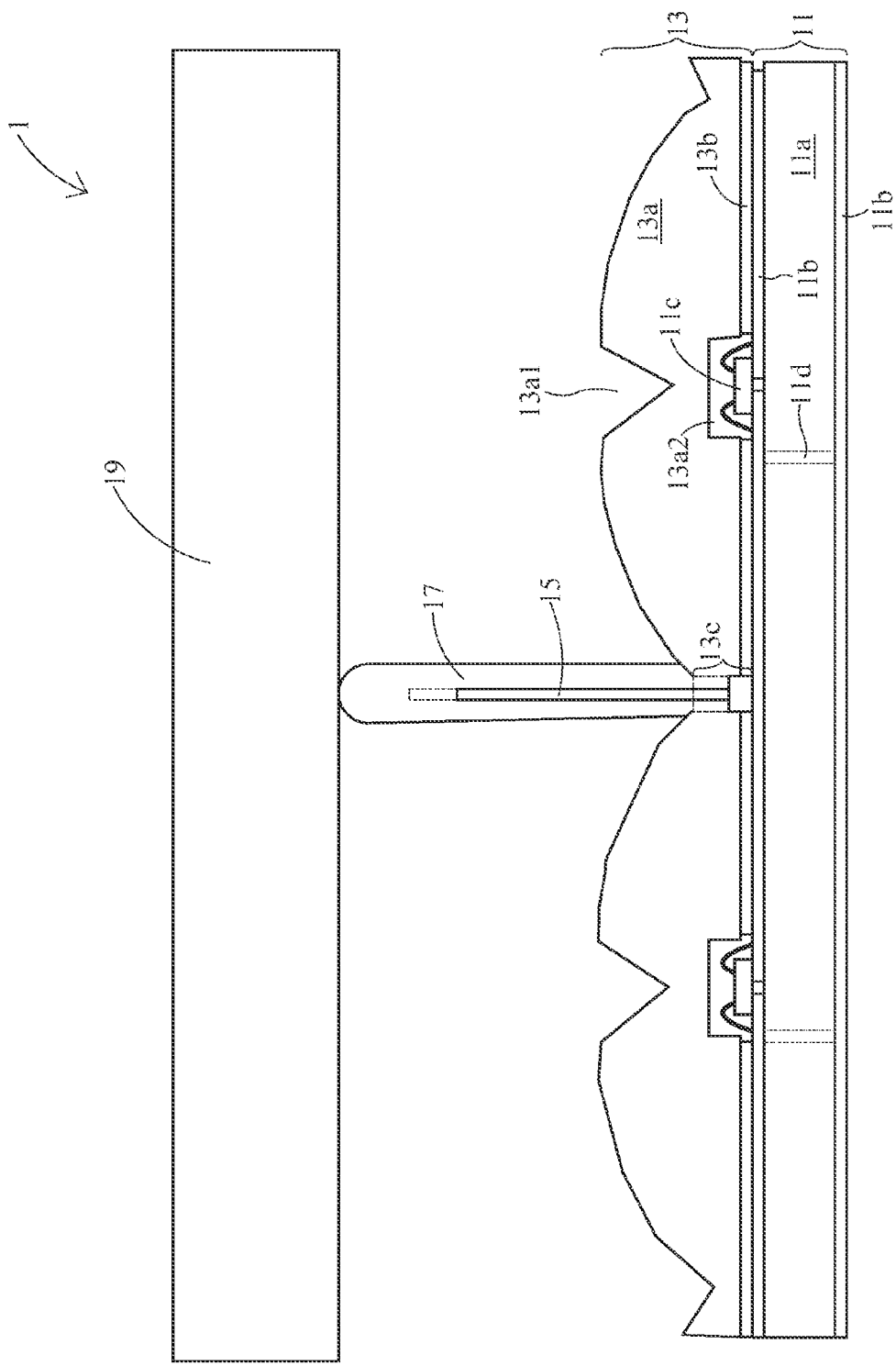

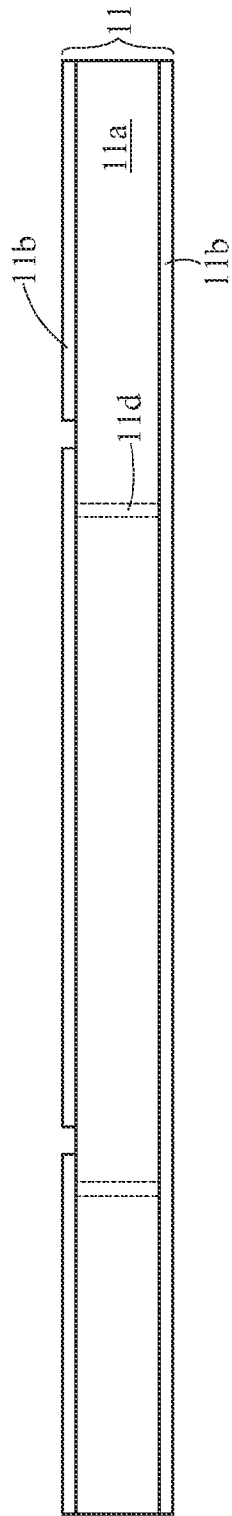
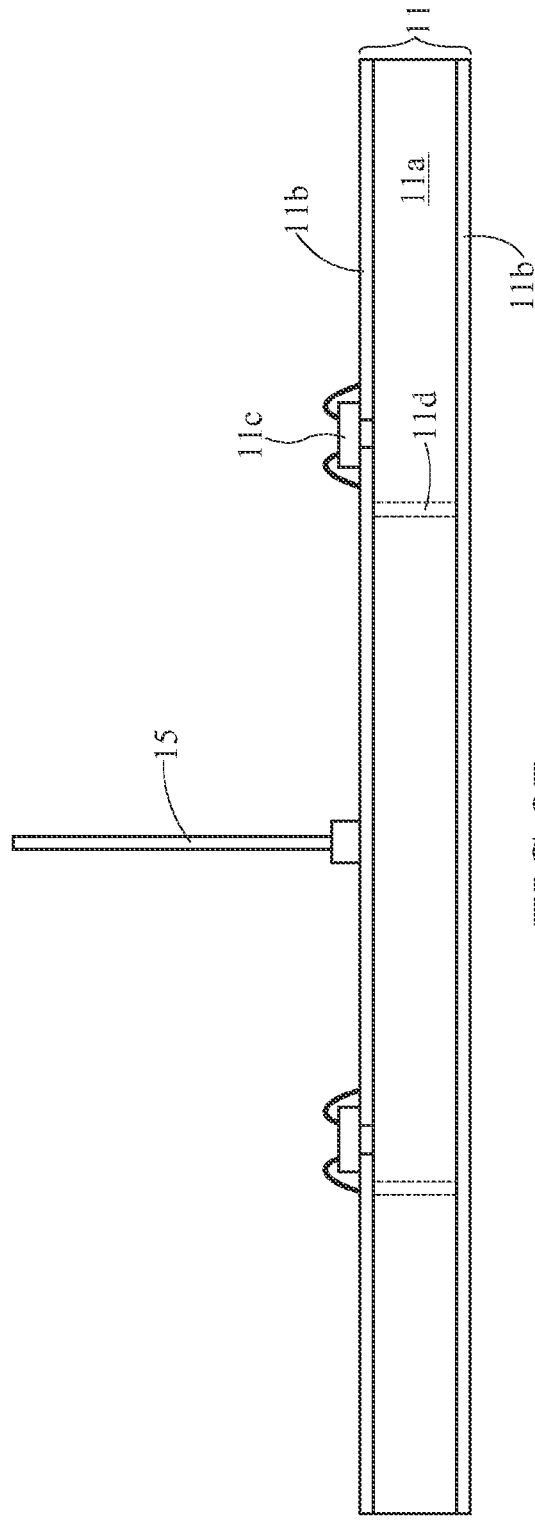

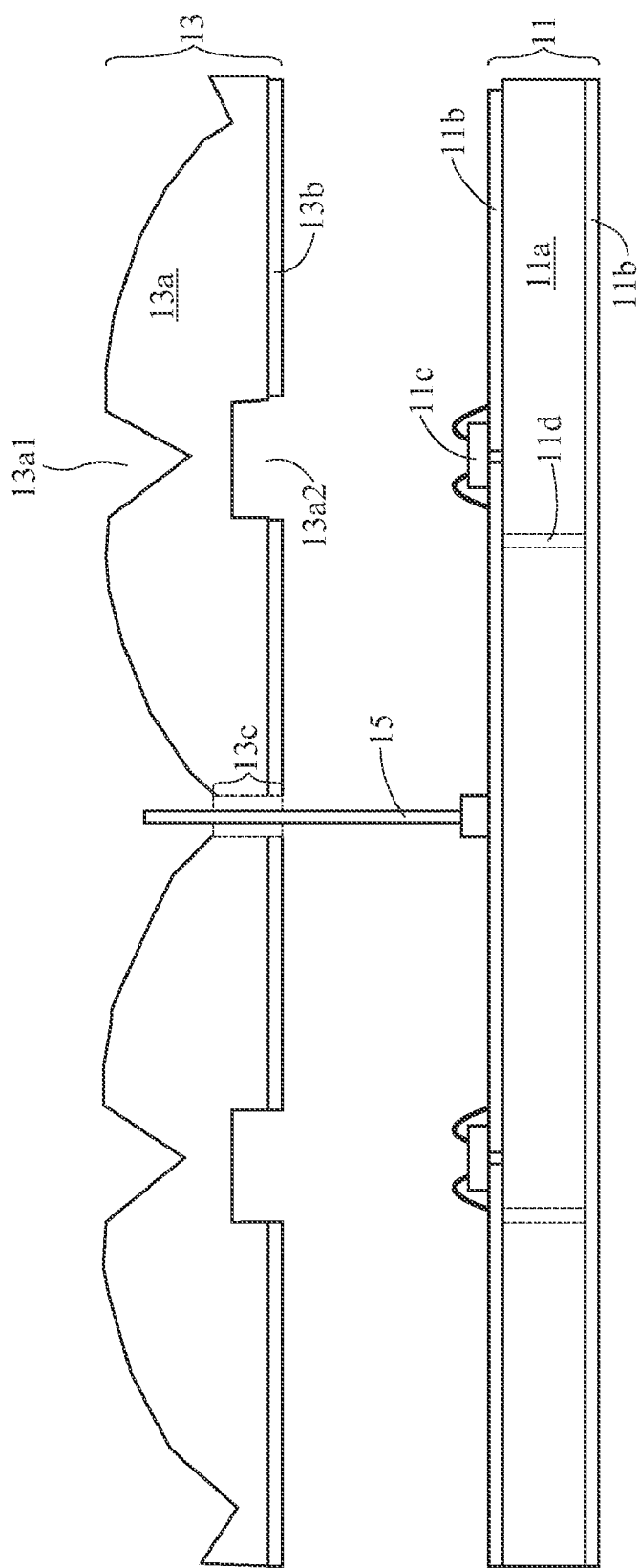

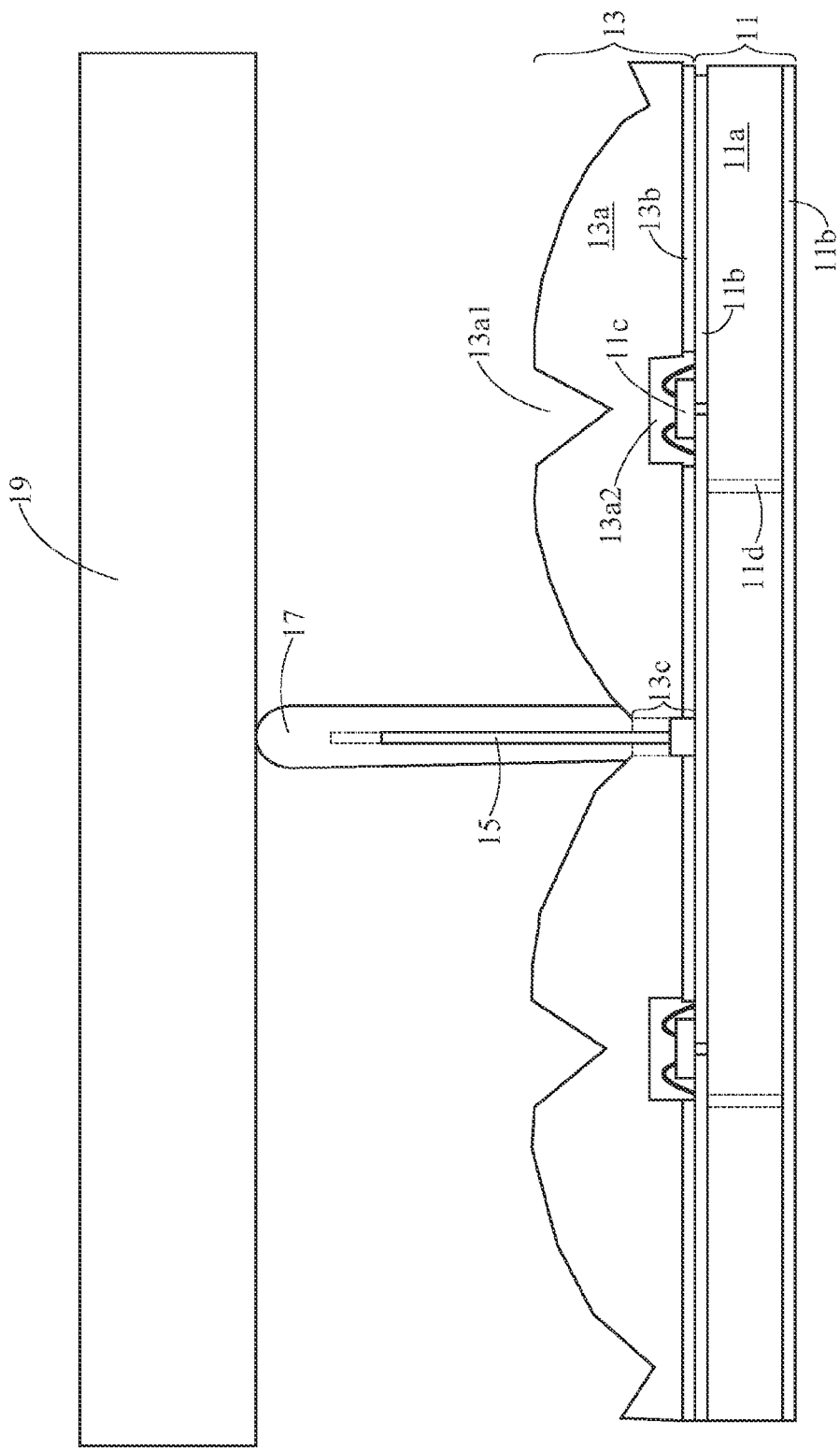

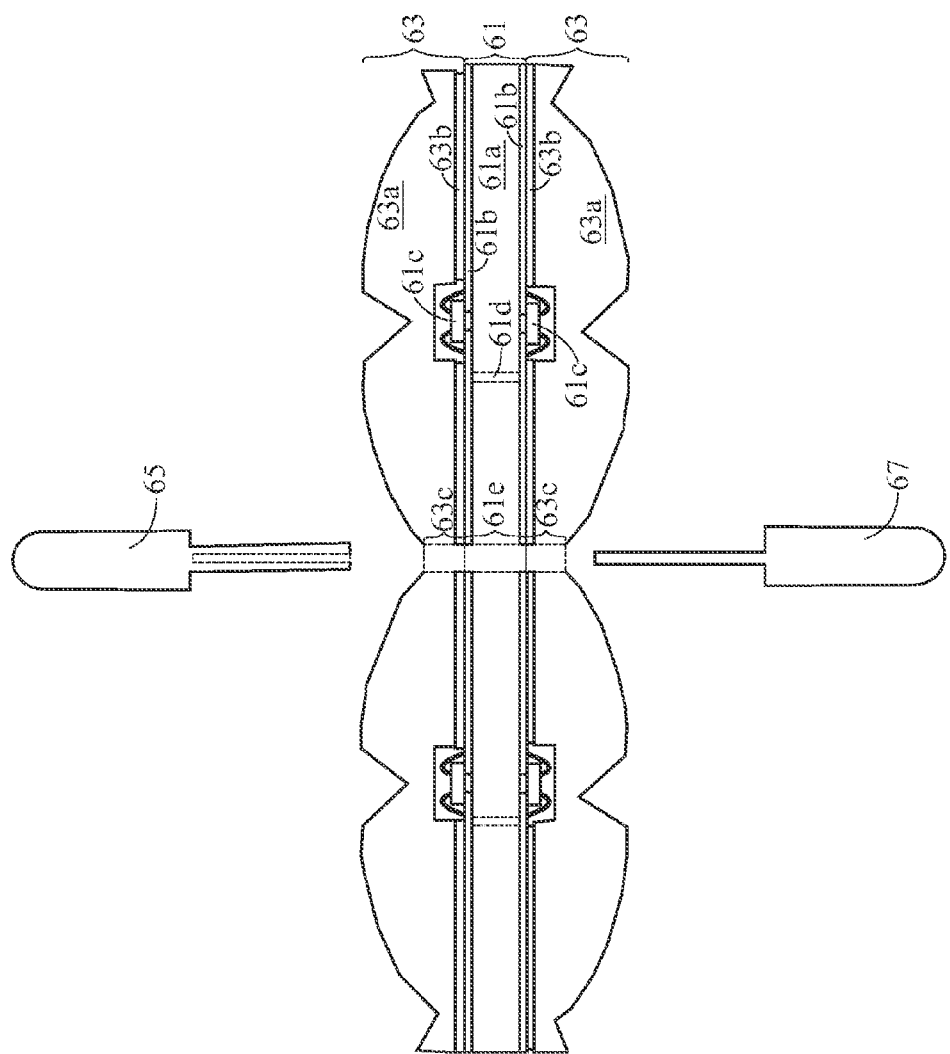

LIGHTING DEVICE

This application claims the benefit of U.S. Provisional Application No. 61/286,448 filed on Dec. 15, 2009, which is hereby incorporated by reference in its entirety.

CROSS-REFERENCES TO RELATED APPLICATIONS

Not applicable.

BACKGROUND OF THE INVENTION

1. Field of the Invention

The present invention relates to a lighting device having a light source module with a plurality of light sources bonded thereon and a plurality of light spreading plates secured onto the substrate through stick objects and hollow caps.

2. Descriptions of the Related Art

The conventional direct-lit backlight module used for a display comprises LEDs directly disposed under the display panel. To enhance the uniformity, a diffuser or a scattering film being disposed in front of the LEDs is needed. Although the direct-lit backlight module is suitable for the large-scale displays, it can be well imagined that the direct-lit backlight module is not only too complicated to arrange the light sources onto the bezel but also too thick since a certain distance is needed for the diffuser or the scattering film to be disposed above the light sources in order to obtain an uniform light output over a large area. In other words, the direct-lit backlight module faces a dilemma to provide a uniform brightness or a thinner configuration.

In order to provide a lighting device being slim and providing uniform backlight, a light spreading plate has been developed. The details of the light spreading plate are described in U.S. patent application Ser. No. 12/879,173 filed on Sep. 10, 2010. U.S. Ser. No. 12/879,173 discloses a plurality of light spreading plates being fixed onto a source module by using adhesive. However, at least two disadvantages of fixing the light spreading plates to the source module by the adhesive are occurred: (1) intensive labor to glue each light spreading plate onto the source module is required, and (2) the adhesion may be deteriorated especially within the environment of high temperature and high humidity.

Moreover, if a diffuser plate is disposed above the light spreading plate, spacers disposed between the light spreading plate and the diffuser plate are needed. Thus, the spacers being glued onto the surface of the light spreading plate may be not reliable enough and thus the intensive labor is also required.

Given the above, a novel and slim lighting device which can be manufactured in a more efficient and reliable manner to provide a uniform backlight is needed in this field.

SUMMARY OF THE INVENTION

The primary objective of this invention is to provide a lighting device and a method for manufacturing the lighting device. The lighting device comprises a source module and a light spreading and a light diffuser plate. The source module include a substrate an electrode layer patterned on the substrate, a plurality of light sources, e.g. LEDs, bonded to be electrically connected with the electrode layer, and a plurality of stick objects being soldered on and protruding from a surface of the substrate. The light spreading plate has through holes for the stick objects to penetrate, and is formed with a plurality of light spreading units having a plurality of cone-shaped recesses being formed with respect to the light sources. The light spreading plates can be secured on the substrate by the stick objects which are preferably sheathed with hollow caps. The light diffuser plate is disposed above the light spreading plates and supported by the hollow caps. In other words, the hollow caps are used as spacers to support the light diffuser plate being spaced apart from the light spreading plates with a specific distance.

The lighting device disclosed in the present invention can resolve the aforementioned problems. During the manufacturing processes, the stick objects being sheathed with the hollow caps not only reduces the labor during product assembly, but also achieves the objectives of supporting and fixing the light spreading plates onto the substrate.

Yet another objective of this invention is to provide a method for manufacturing the lighting device. The stick objects are soldered onto the substrate in a configuration of protruding from the surface of the substrate. The light spreading plate may have a plurality of through holes for the stick object to penetrate. Thus, the light spreading plates can be orientated and accurately assembled onto the substrate through the stick objects.

To achieve the abovementioned objectives, the present invention discloses a lighting device comprising a light source module, a plurality of light spreading plates, a plurality of stick objects, a plurality of hollow caps and a light diffuser plate. The light source module has a substrate, an electrode layer patterned on the substrate, and a plurality of light sources bonded on the substrate to electrically connect with the electrode layer. The light spreading plates is disposed onto the light source module. Each of the light spreading plate has a light traveling layer formed a plurality of light spreading units, a light scattering layer coated onto the light traveling layer, and a plurality of through holes. Each of the through holes is formed at a periphery of one of the light spreading units. The stick objects are disposed at the substrate and protruding the through holes respectively. Each of the hollow caps having a hole to receive one of the stick objects so that the light spreading plates are secure onto the substrate when the stick objects penetrate the through holes to be sheathed with a plurality of hollow caps, respectively.

The present invention further discloses a method for manufacturing the lighting device. The method comprises the following steps: providing a light source module having a substrate, an electrode layer patterned on the substrate, a plurality of light sources bonded to be electrically connected with the electrode layer, and a plurality of stick objects being soldered (or embedded) on and protruding from the substrate; providing a plurality of light spreading plates each of which including a plurality of light spreading units and has a plurality through holes, wherein each of the through holes is formed at a periphery of one of the light spreading units; disposing the light spreading plates onto the substrate in such a way that the stick objects penetrate the through holes; providing hollow caps to make the stick objects be sheathed therein.

Yet another objective of this invention is to provide a double-side lighting device. The lighting device comprises a light source module and a plurality of light spreading plates. The light source module a plurality of light sources bonded onto the two opposite surface thereof. The light spreading plates are disposed on the two opposite surfaces of the substrate, and two light diffuser plate are disposed above the light spreading plates at two opposite surfaces of the light source module. Similarly, the light spreading plates are secured onto the two opposite surfaces of the light source module by the stick caps sheathed with hollow caps having an extending hole for receiving one of the stick caps, so that the light diffuser plates are supported and spaced apart from the light spreading plates with a specific distance.

Yet another objective of this invention is to provide a method for manufacturing the double-side lighting device. The stick caps and the hollow caps are connected to secure the light spreading plates disposed onto two opposite surfaces of the light source module. The stick caps and the hollow caps act as spacers to support the light diffuser plates spacing apart from the light spreading plates with a specific distance.

To achieve the abovementioned objectives, the present invention further discloses a lighting device. The lighting device comprise a light source module, a plurality of light spreading plates, a plurality of stick caps, a plurality of hollow caps. The light source module has a plurality of light sources. The light spreading plates are disposed onto two opposite surfaces of the light source module. Each of the light spreading plate has a light traveling layer formed with a plurality of light spreading units, a light scattering layer coated onto the light traveling layer, and a plurality of second through holes, wherein each of the second through holes is formed at a periphery of one of the light spreading units. Each of the hollow caps has an extending hole for receiving one of the stick caps so that the light spreading plates are secured onto the opposite surfaces of the substrate when the stick objects are connected to the hollow caps via the first through holes of the light source module and the second through holes of the light spreading plates, respectively.

The present invention further discloses a method for manufacturing the lighting device. The method comprises the following steps: providing a light source module having a substrate, an electrode layer patterned on two opposite surface of the substrate, a plurality of light sources bonded onto the two opposite surface of the substrate to electrically connect with the electrode layer, and a plurality of first through holes; providing light spreading plates, each of which having a plurality of light spreading units and a plurality second through hole formed at a periphery of one of the light spreading units; and securing the light spreading plates onto two opposite surfaces of the light source module by connecting a plurality of stick caps with a plurality of hollow caps via the first through holes of the substrate and the second through holes of the light spreading plates.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1 is a cross-sectional view illustrating a part of the lighting device in accordance with the first embodiment of the present invention;

FIGS. 2A to 2G are schematic views illustrating the second embodiment of the present invention;

FIGS. 7A to 7F are schematic views illustrating the sixth embodiment of the present invention.

DESCRIPTION OF THE PREFERRED EMBODIMENT

Figure 2D:
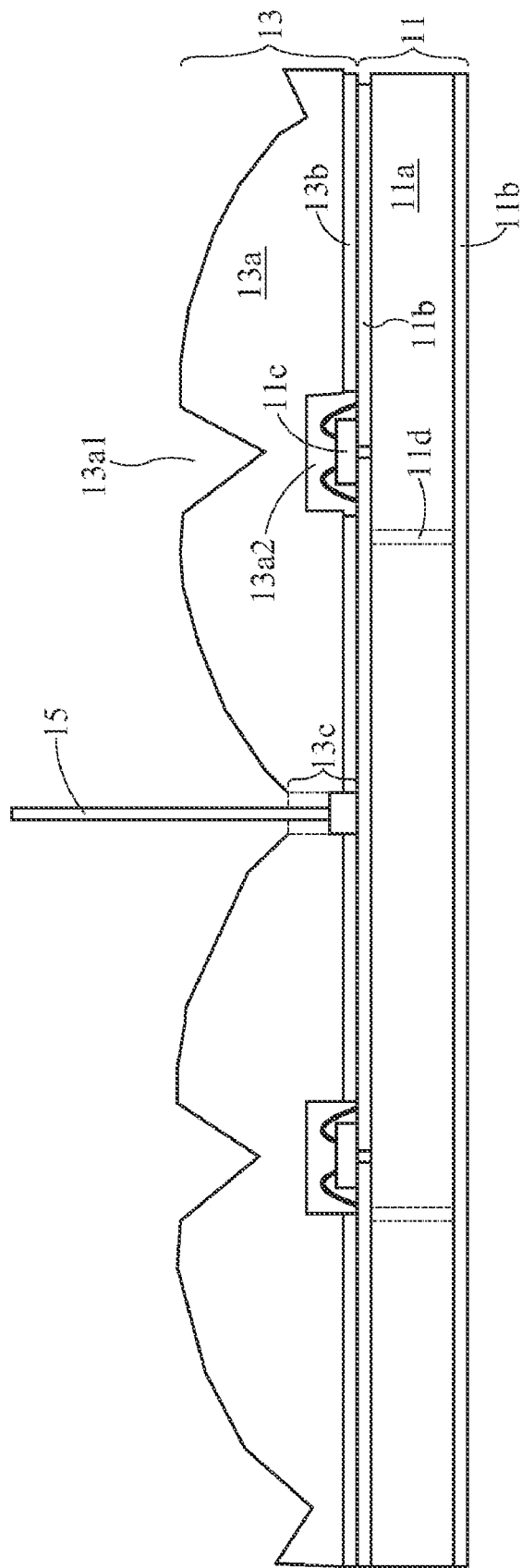

The present invention relates to a lighting device, more specifically, a direct-lit backlight module. FIG. 1 illustrates the cross-sectional view of a part of the lighting device 1 in accordance with the first embodiment of the present invention. The lighting device 1 comprises a light source module 11, a plurality of light spreading plates 13, a plurality of stick objects 15, a plurality of hollow caps 17, a light diffuser plate 19. It should be noticed that for ease of understanding and as restricted by the paper size, only a part of the lighting device 1 is depicted in FIG. 1, and the whole lighting device 1 is simply a repeated extension of the part depicted in FIG. 1.

The light source module 11 comprises a substrate 11$a$, electrode layers 11$b$ patterned on the substrate 11$a$, a plurality of light sources 11$c$.

The substrate 11$a$ can be a printed circuit board (PCB) or a flexible printed circuit board (FPC). In addition, the substrate 11$a$ can be made of plastic, glass, ceramic or polymer composites. The electrode layers 11$b$ are patterned onto two surfaces, i.e., the top surface and the bottom surface, of the substrate 11$a$ to be electrically connected through the via hole 11$d$. The electrode layers 11$b$ can be made of Cu, Ag, Ni, Au, Al or conductive inks such as silver paste, cupper paste or carbon black paste.

The light sources 11$c$, e.g., an LED die or an LED die encapsulated by encapsulant, are wire bonded or flip chip bonded to electrically connect with the electrode layer 11$b$. The encapsulant includes any conventional glue being dispensed onto the LED dice to enclosed and protect the LED dice. The encapsulant could be made of transparent or translucent polymer resins such as polyurethane based polymer, epoxy based polymer, silicon based polymer, acrylic polymer, polyethylene, polystyrene, polycarbonate, PMMA, ABS, thermal curable material, or UV curable material. The encapsulant could also be made of transparent polymer materials containing light scattering particles such as titanium dioxide particles, calcium carbonate particles, silica oxide particles, polymeric particles with differentiable refractive index, air microvoids or the combination thereof. Alternatively, the encapsulant could be made of a phosphor material for converting UV, blue or other color light emitted from the LED dice into white light. The light sources 11$c$ can also be an SMD type LED which can be electrically connected to the electrode layer 11$b$ by a conventional SMT process.

Furthermore, in some practices, the light source 11$c$ can include a plurality of LED dice bonded on the electrode layers 11$b$. In this case, each of the light spreading units will act like a light mixer to uniformly mix different color LED light together. For example, when the unit overlays a red light LED, a green light LED and a blue light LED, it can uniformly mix the RGB light to product white light. In addition, each of the different color light LEDs can be individually selected to provide a single color light, i.e., the red light, the green light or the blue light.

The stick objects 15 are soldered on the top surface of the substrate 11a of the light source module 11. The stick objects 15 can be made of a metal material or a transparent or translucent plastic materials such as silicon rubber, polyurethane, polystyrene, polyester, polycarbonate, polyimide, polyacrylic resin, PMMA, ABS, PVC, PE, PP or a combination thereof.

The light spreading plates 13 comprising a light traveling layer 13a, a light scattering layer 13b coated onto the bottom surface of the light traveling layer 13a, and a plurality of through hole 13c are disposed on the light source module 11. In this manner, the stick objects 15 could penetrate the through holes 13c of the light spreading plates 13. Then, each of the hollow caps 17 has an extending hole to receive the stick shape object 15. In this manner, the hollow cap 17 is used to make the stick shape object 15 to be sheathed in the extending hole. The hollow caps 17 can be made of a transparent or translucent plastic material such as silicon rubber, polyurethane, polystyrene, polyester, polycarbonate, polyimide, polyacrylic resin, PMMA, ABS, PVC, PE, PP or a combination thereof.

The light traveling layer 13a can be made of any type of transparent (or translucent) polymeric materials such as silicon rubber, polyurethane, polystyrene, polyester, polycarbonate, polyimide, polyacrylic resin, polymethylmethacrylate (PMMA), acrylonitrile butadiene styrene (ABS), polyvinylchloride (PVC), polyethylene (PE), polypropylene (PP) or a combination thereof. The light traveling layer 13a can be divided in to a plurality of spreading units and formed with the through holds 13c for the stick objects 15 to penetrate. Each of the through holds 13c is formed at a periphery of one of the light spreading units. Each of the light spreading units is formed with a main body being defined with a top surface, a bottom surface and a peripheral. The thickness of the main body is tapered towards the peripheral. As shown in FIG. 1, in this embodiment, the main body is a dome-shaped body comprising a first recess 13a1, e.g., a cone-shaped recess, formed on the top surface of the dome-shaped body. The configuration of the cone-shaped recess 13a1 has a plurality of angular surfaces. In addition, the dome-shaped body also has a second recess 13a2, e.g., a bowl-shape recess or cylinder-shaped recess or cone-shaped recess, formed on a bottom surface of the dome-shaped body being utilized to accommodate the light source 11c. Furthermore, the top surface of each of the spreading units can be a matt surface to scatter the light more uniformly thereon.

It should be noticed that in other embodiments, the main body can be formed with any shape as disclosed in Ser. No. 12/879,173 and the first recess of the main body can further be filled with a light diffusing material which is made of transparent polymer materials containing light scattering particles such as titanium dioxide particles, calcium carbonate particles, silica oxide particles, aluminum oxide particles, zinc oxide particles, tin oxide particles, germanium oxide particles, metallic particles, or air microvoids or a mixture of plurality types of particles. The refractive index of the light diffusion material is preferred to be different from the light traveling layer of the light spreading plate 13. Moreover, the refractive index of the lighting diffusion material is preferred to be lower than the light traveling layer of the light spreading plate 13.

The light spreading plates 13 further comprises a light scattering layer 13b. The light scattering layer 13b can be made of transparent or translucent resins, for example, a polymer resin, containing light scattering particles such as titanium dioxide (e.g., a commercial white color paints), calcium carbonate, silica oxide, polymeric particle with differentiable refractive index, or air microvoids, and be sprayed or coated onto the bottom surface of the light spreading plates 13 on areas outside the second recess 13a2. The light scattering layer 13b can reflect and scatter the light generated from the light source 11c to enhance the utilization of the light. Thus, the lighting device 1 is able to provide a uniform surface light with an ultra thin configuration.

Since the majority of light generated from the light source travels along the normal of the light source module 11, the cone-shaped recess 13a1 formed at the top of the dome-shaped body of each of the light source module 11 assists guiding the light departing from the normal of the light source module 11 and towards the peripheral of the dome-shaped body. Light still travels through the cone-shaped recess 13a1 can be further scattered by the light diffusing material filled within the cone-shaped recess 13a1 or by the patterned diffuser covered on top of the cone-shaped recess 13a1. Thus, light generated from the light source 11c can be well uniformized.

The light diffuser plate 19 is disposed above the light spreading plate 13 and supported by the hollow cap 17 to space apart from the light spreading plate 13 with a specific distance. The light diffuser plate 19 can be made of any type of translucent plastic materials such as PMMA, ABS, PVC, PE, PP or a combination thereof.

Figure 2E:
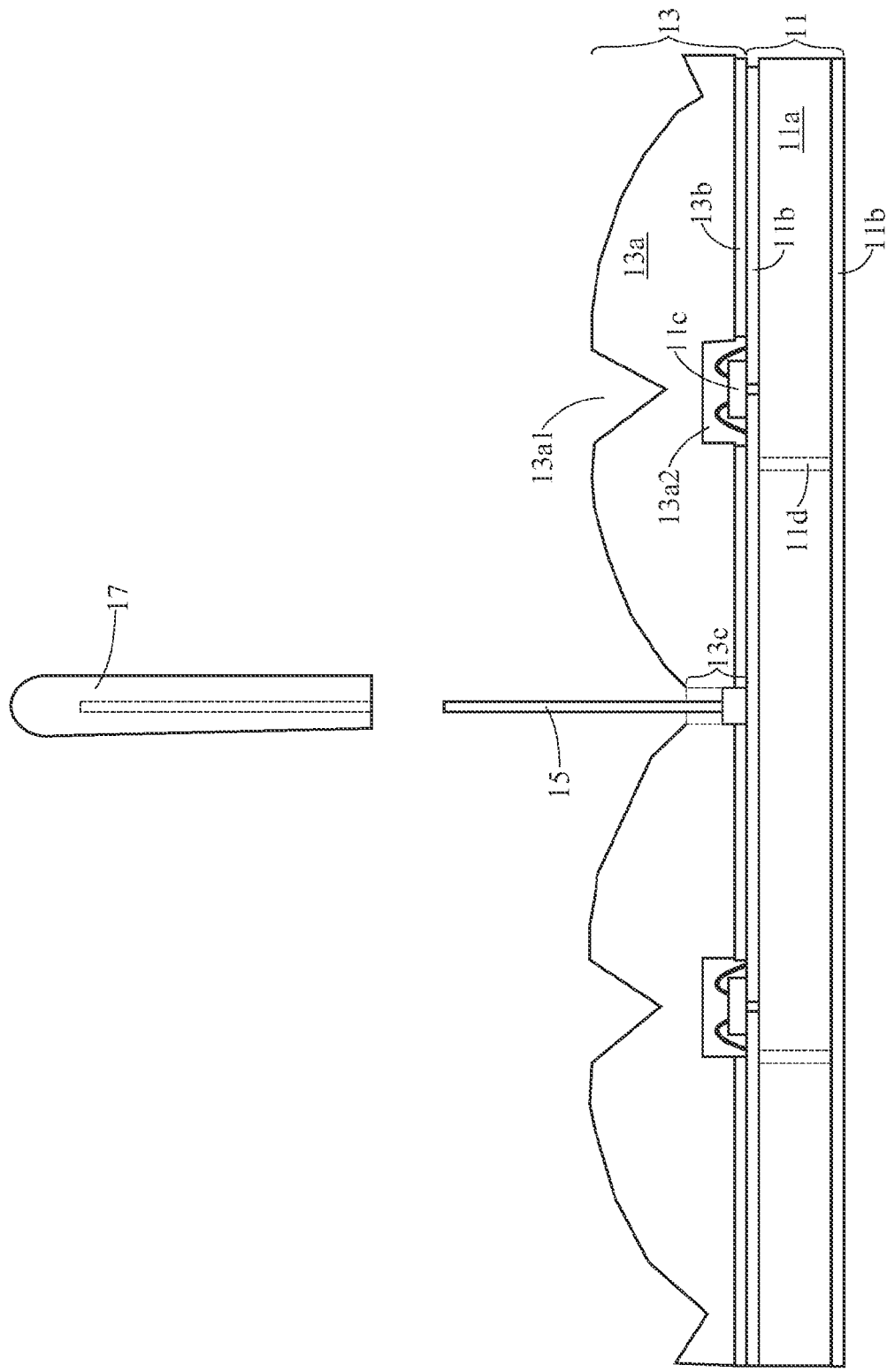
Figure 2F:
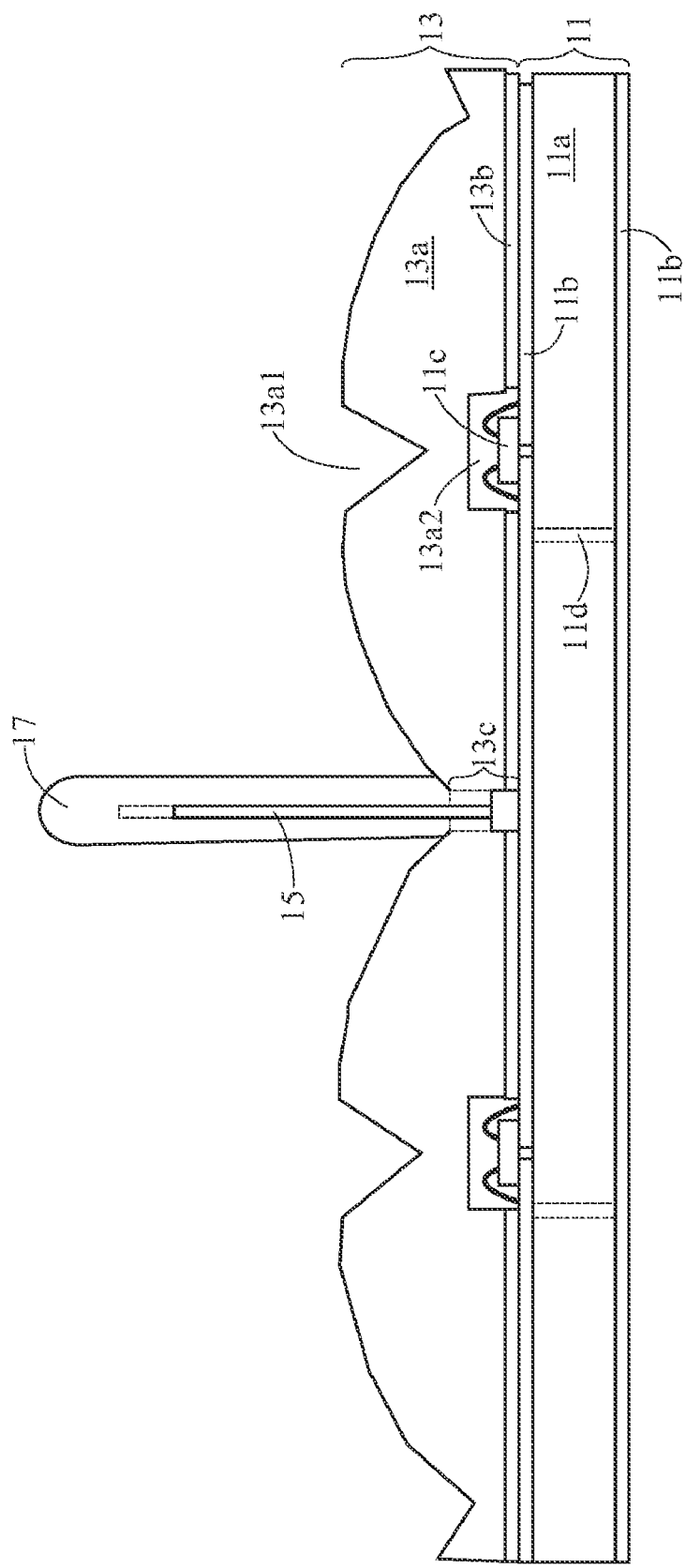

The second embodiment of the present invention relates to a method for manufacturing the lighting device 1 in the first embodiment. First, as shown in FIG. 2A to FIG. 2B, the light source module 11 is provided. The light source module 11 comprises the substrate 11a, the electrode layers 11b patterned onto two opposite surfaces, i.e., the top surface and the bottom surface, of the substrate 11a and electrically connected with each other through a via hole 11d. Next, as shown in FIG. 2B, the light sources 11c, e.g., LED dies encapsulated with encapsulant, are bonded onto the electrode layers 11b. The stick objects 15 are soldered onto the substrate 11a. As shown in FIG. 2C and FIG. 2D, the light spreading plates 13 are provided. The light spreading plate 13 comprise a light travelling layer 13a, a light scattering layer 13b coated onto the bottom surface of light travelling layer on areas outside the second recess 13a2, and through holes 13c for the stick objects 15 to penetrate when the light spreading plates 13 are disposed onto the substrate 11. In FIG. 2E to FIG. 2F, the hollow cap 17 with a extending inner hole is adapted to receive the stick object 15 so that the stick object 15 is sheathed with the hollow cap 17 for securing the light spreading plates 13 onto the light source module 11. Finally, as shown in FIG. 2G, the light diffuser plate 19 is disposed above the light spreading plates 13 and supported by the hollow cap 17 to space apart from the light spreading plates 13 with a specific distance.

Figure 3A:
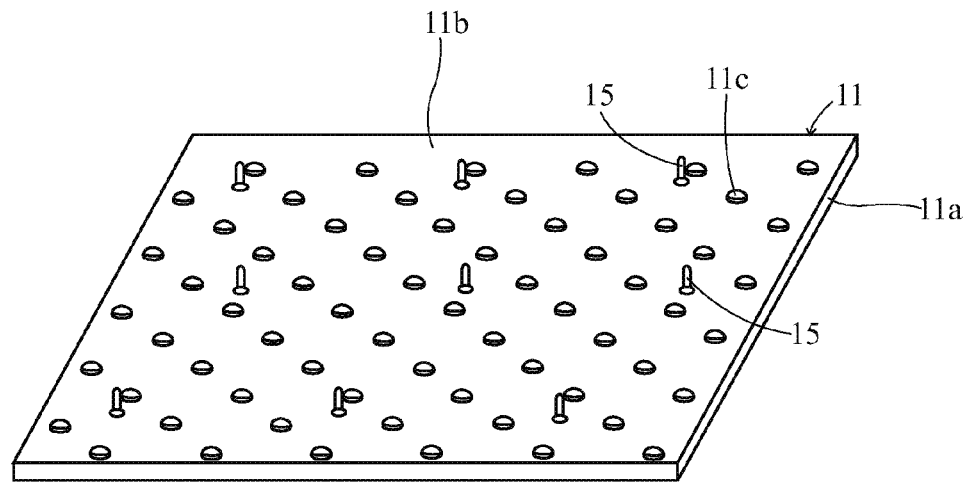
FIGS. 3A to 3D are schematic views illustrating the lighting device of the present invention.
Figure 3B:
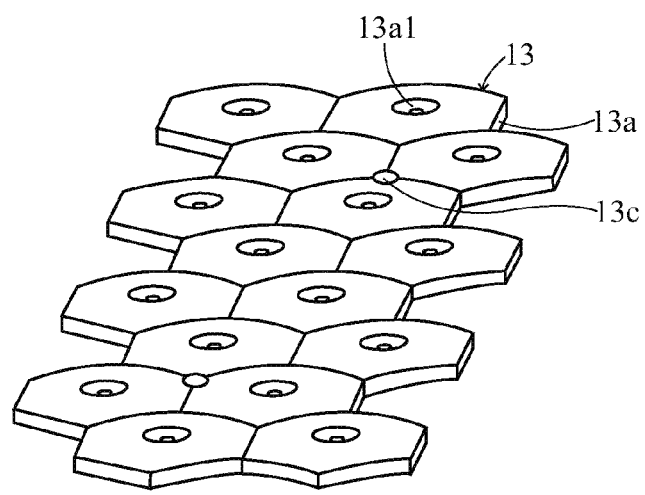
Figure 3C:
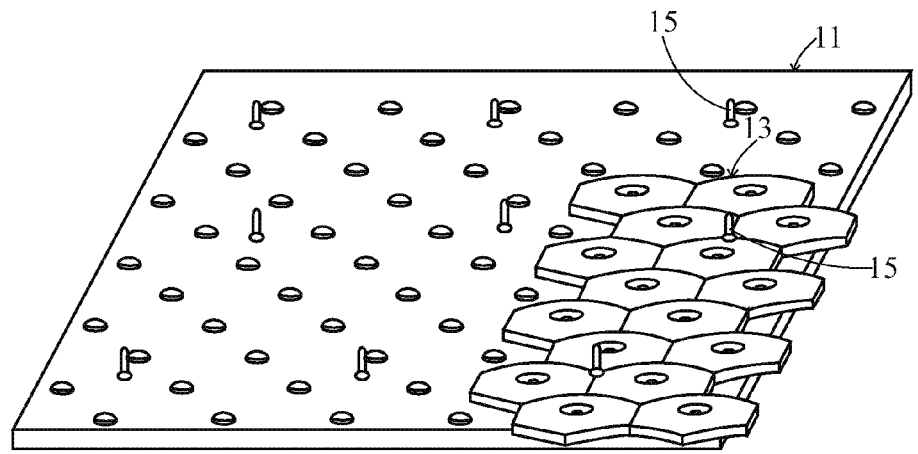
Figure 3D:
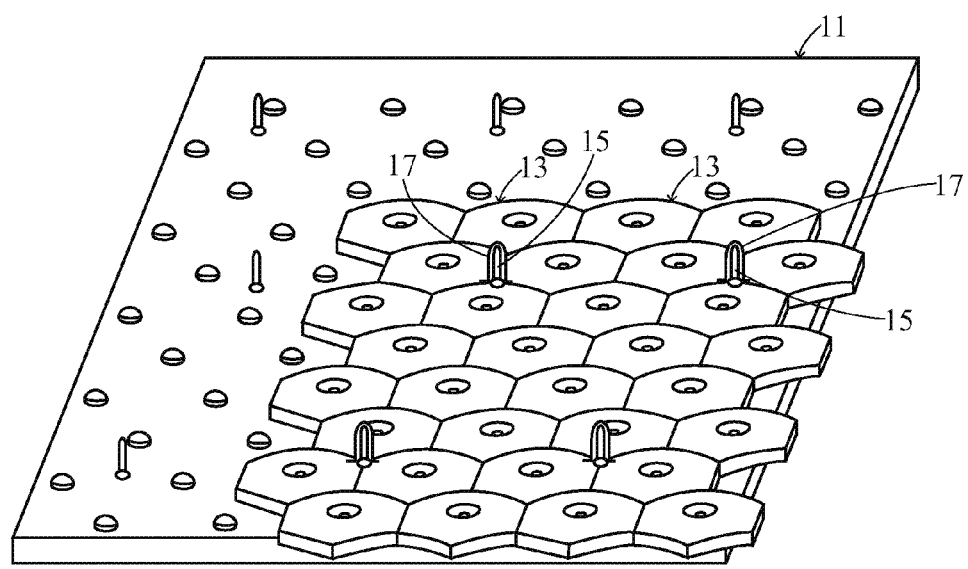

FIG. 3A to FIG. 3D are schematic views illustrating the lighting device of the present invention. The light source module 11 comprising the substrate 11a, e.g., a PCB substrate, the electrode layer 11b and the light sources 11c, and the stick objects 15 soldered on the top surface of the substrate 11a are shown in FIG. 3A. The light sources 11c, e.g., LED dies, could be encapsulated by applying encapsulant. FIG. 3B illustrates the light spreading plate 13 having the light travelling layer 13a. The light travelling layer 13a includes a plurality of light spreading units connected and arranged with each other, for example, in a configuration of honeycomb. Each of the light spreading units is formed with dome-shaped body comprising a first recess 13a1 and a second recess (not shown). The light travelling layer 13a is formed with through holes 13c at the periphery of one of the light spreading units. Referring to FIG. 3C, one of light spreading plates 13 is assembled onto the light source module 11 in which the stick objects 15 correspondingly penetrate the through holes 13c of the light spreading plate 13. Conceivably, a plurality of the light spreading plates 13 can be individually manufactured and then assembled with each other in a seamless configuration, as shown in FIG. 3D, onto the light source module 11. Then, the stick objects 15 are sheathed with the hollow cap 17 to secure the light spreading plates 13 onto the light source module 11. It is noted that the dome-shaped units are designed and arranged according to the pitches of the light sources 11c.

Figure 4A:
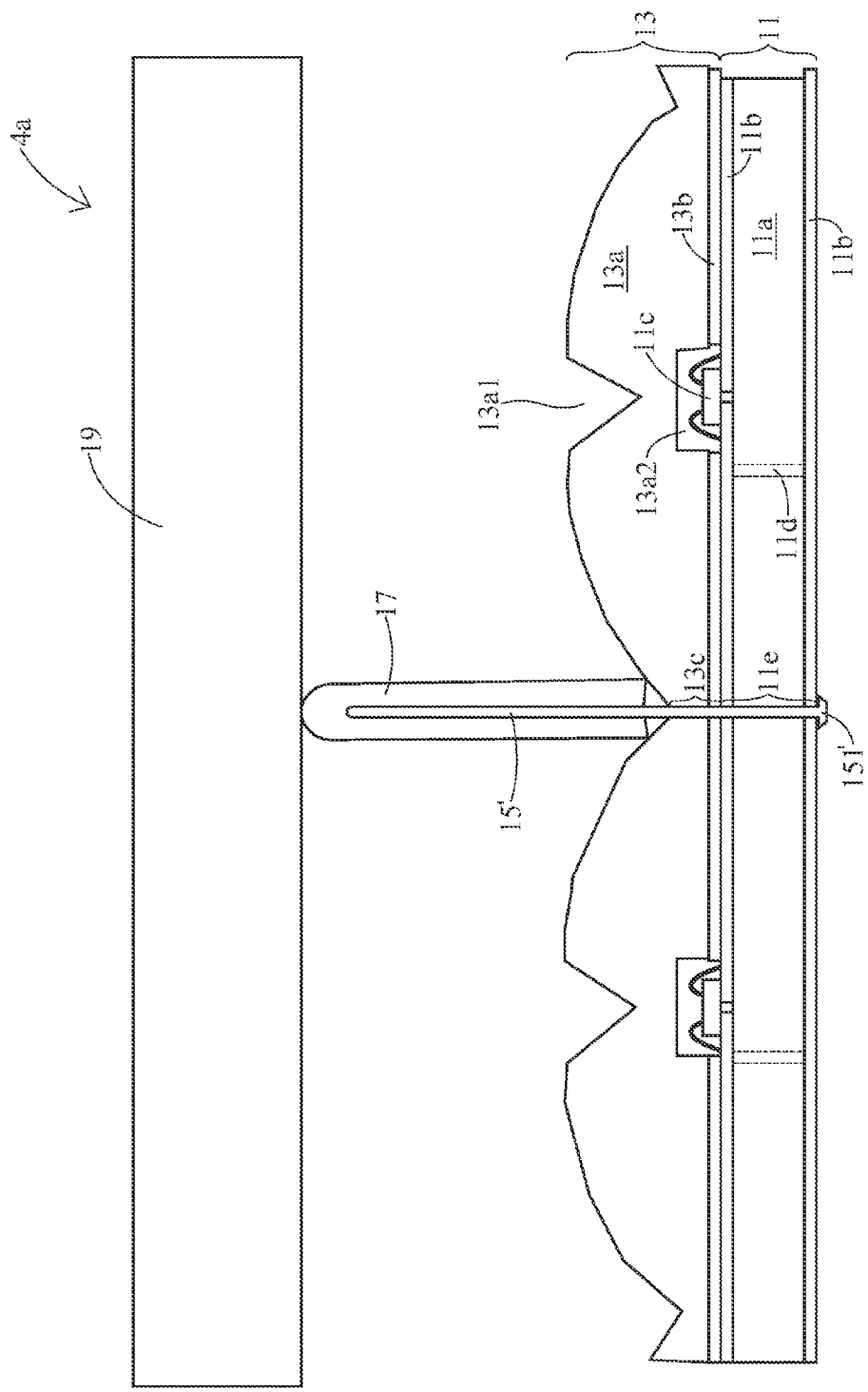
FIG. 4A is a schematic view illustrating a part of the lighting device in accordance with the third embodiment of the present invention.

FIG. 4A is schematic views illustrating the lighting device 4a in accordance with the third embodiment of the present invention. In this embodiment, the light source module 11 also has a plurality of through holes 11e. The stick object 15' having a stopper 151' at the bottom end thereof is embedded in the light source module 11 by partially penetrating the through holes and partially being stuck at the bottom surface of the light source module 11 by the stopper 151'. Similarly, each of the hollow caps 17 has an extending hole to receive the stick object 15' so that the stick object 15' is sheath in the extending hole to secure the light spreading plate 13 onto the light source module 11 and support the light diffuser plate 19 being disposed above the light source module 11 with a distance therebetween.

Figure 4B:
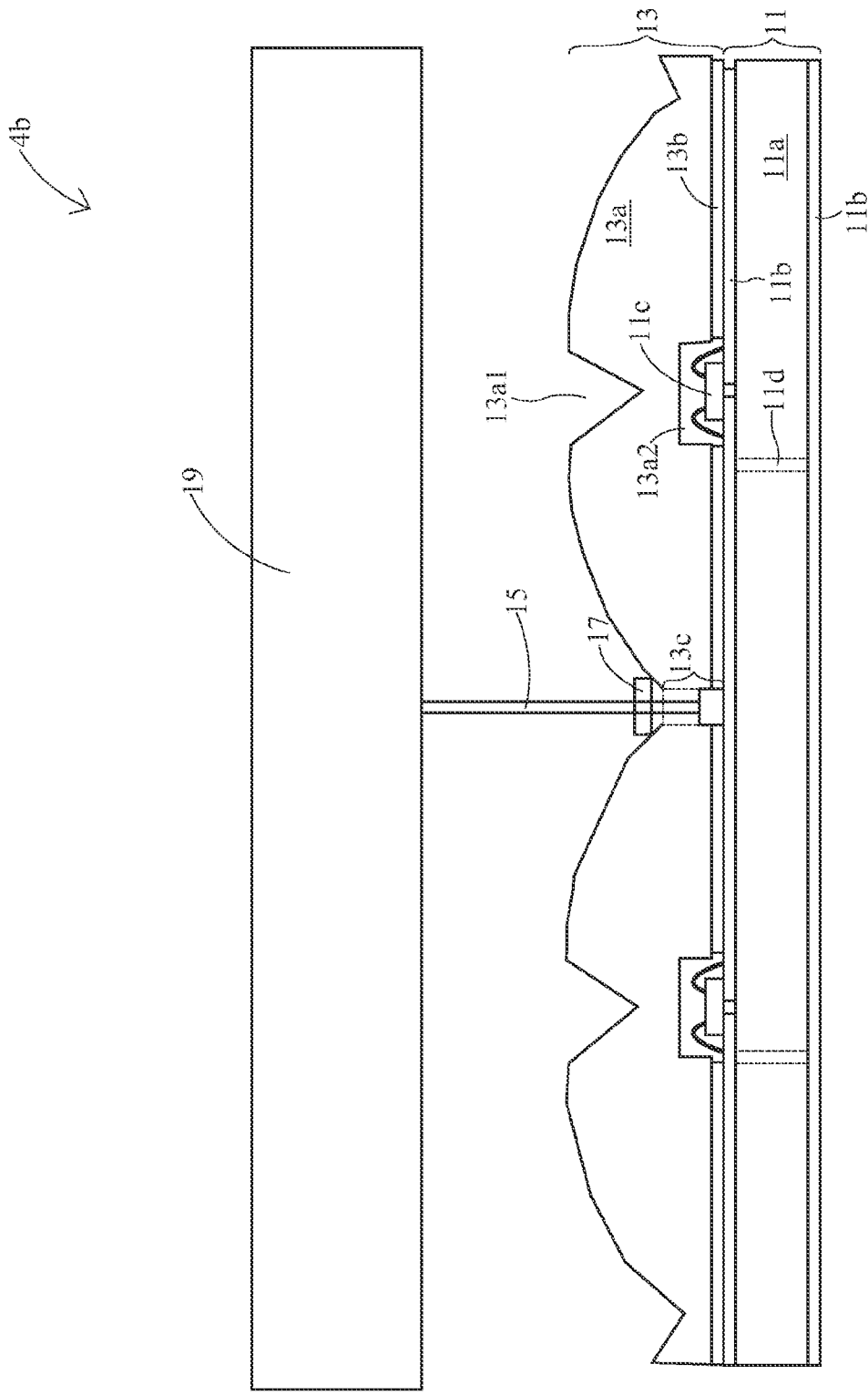
FIG. 4B is a schematic view illustrating a part of the lighting device in accordance with the fourth embodiment of the present invention.

FIG. 4B is schematic views illustrating the lighting device 4b in accordance with the fourth embodiment of the present invention. Unlike the first embodiment, the hollow caps 17' are nuts (or something similar) and the stick objects 15 are bolts (or something similar). In this way, by screwing the nuts onto the bolts, the light spreading plates 13 would be fasten onto the light source module 11 as well. In addition, in this embodiment, the light diffuser plate 19 is supported by the stick objects 15 to space apart from the light spreading plate 13 with the specific distance.

Figure 5:
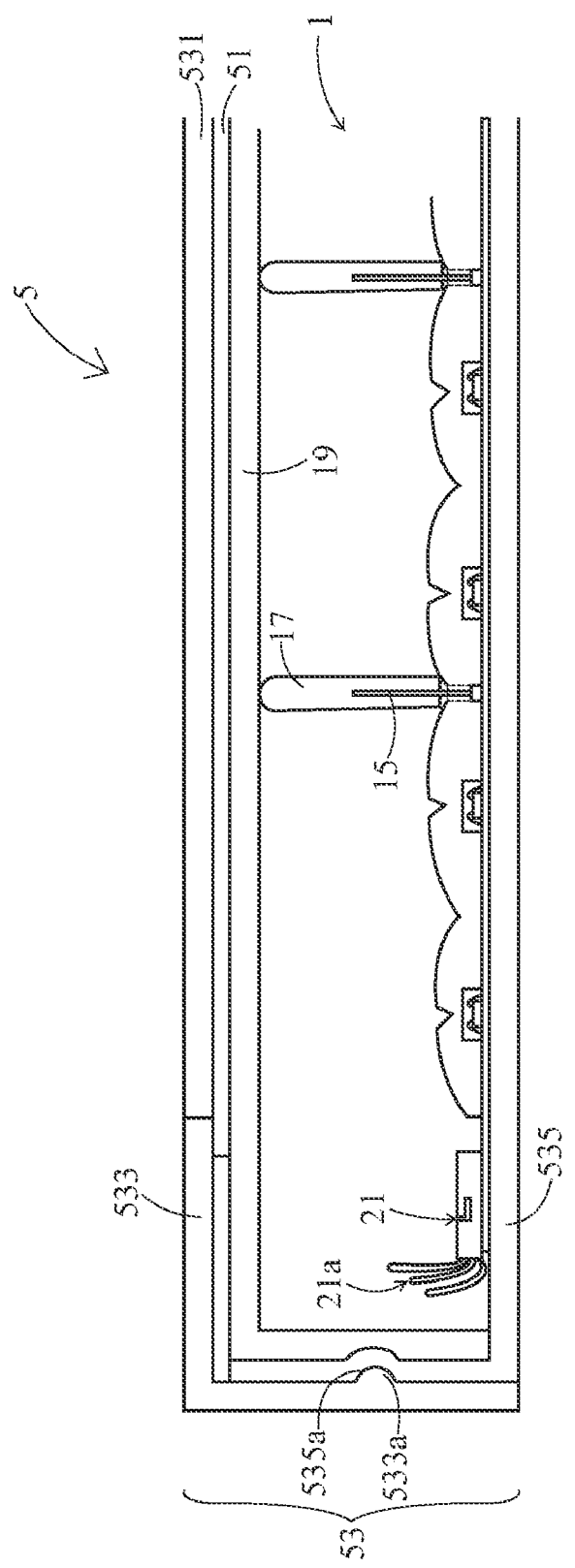
FIG. 5 is a schematic view illustrating a light box which uses the lighting device in first embodiment of the present invention as a direct-lit backlight module.

FIG. 5 is schematic views illustrating a light box 5 having a direct-lit backlight module which uses the lighting device 1 in the first embodiment of the present invention. The light box 5 has a translucent film 51, such as a slide having printed pictures, disposed on the light diffuser plate 17 of the lighting device 1. A rectangle-shaped housing 53 made of wood, metal, or plastic. The rectangle-shaped housing 53 has a protective film 531 which is formed of transparent acryl material to enclose the translucent film 51 and the lighting device 1. Thus, light generated from the lighting device 1 can be emitted out the rectangle-shaped housing 53 through the translucent film 51 and the protective film 531. The rectangle-shaped housing 53 is assembled by joining two frames 533, 535 together, for example, the frame 533 has tenons 533a on its peripheral and the frame 535 has mortises 535a corresponding to the tenons 533a. Therefore, the frames 533, 535 can be easily and firmly jointed with each other by the tenons 533a fitting with the mortises 535b. It is noticed that the lighting device 1 further comprise a connector 21 with electrical wires 21a for use in electrically connecting to a controller which utilized to drive the lighting device 1. Conceivably, the light box 5 can also use the lighting device 4 as a direct-lit backlight module.

Figure 6:
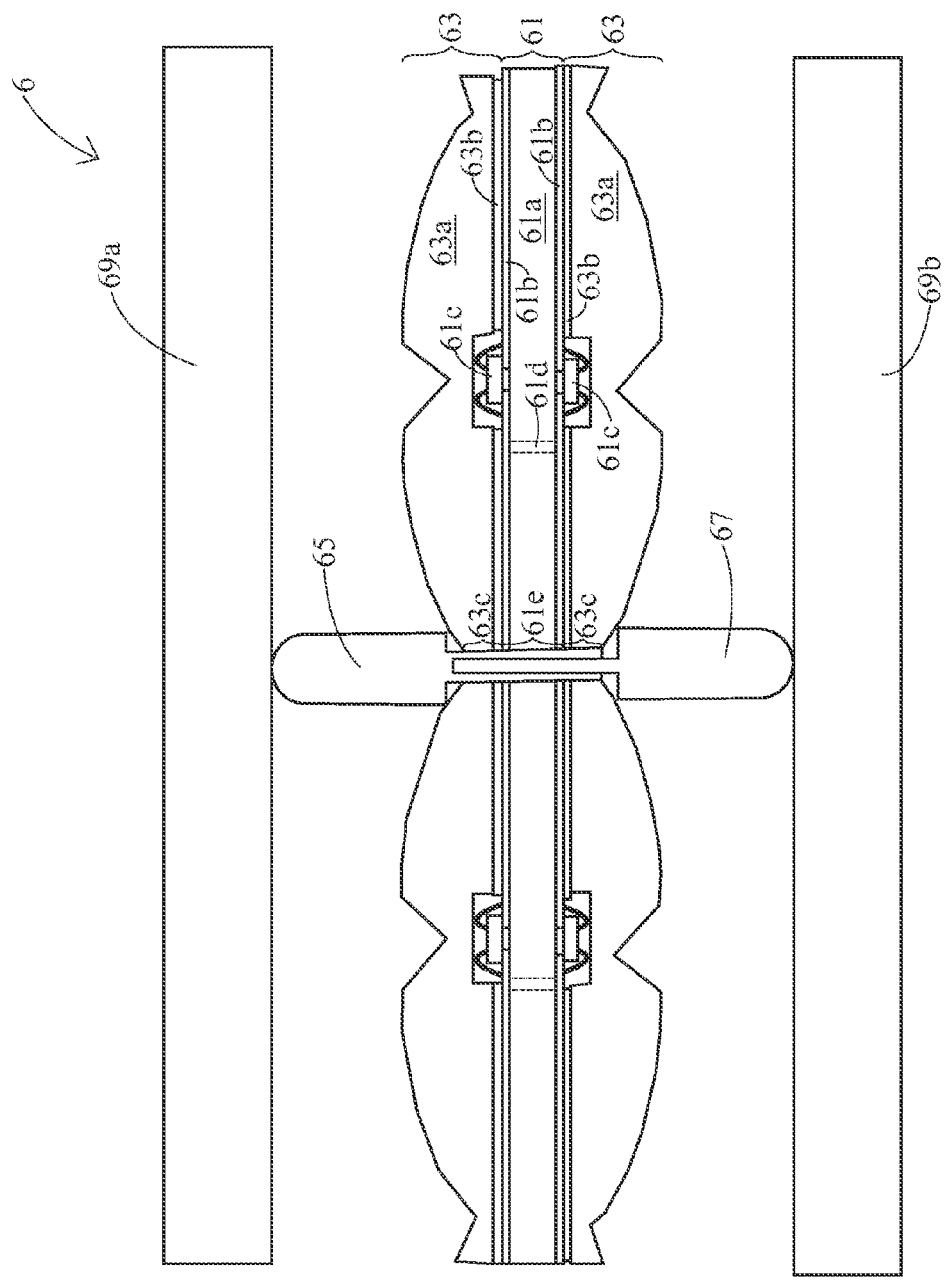
FIG. 6 is a schematic view illustrating a double-side lighting device in accordance with the fifth embodiment of the present invention.

FIG. 6 illustrates the cross-sectional view of a part of a double-side lighting device 6 of the fifth embodiment of the present invention. The lighting device 6 comprises a light source module 61, a plurality of light spreading plates 63, hollow caps 65, stick caps 67, and two light diffuser plates 69a, 69b.

The light source module 61 comprises a substrate 61a, electrode layers 61b and a plurality of light sources 61c. The substrate 61a can be a printed circuit board (PCB) or a flexible printed circuit board (FPC). In addition, the substrate 61a can be made of plastic, glass, ceramic or polymer composites. The electrode layers 61b are patterned on the two opposite surfaces, i.e., the top surface and bottom surface, of the substrate 61a and electrically connected through the via hole 61d. Similar to the electrode layers 11b in the first embodiment, the electrode layers 61b can be made of Cu, Ag, Ni, Au, Al or conductive inks such as silver paste, cupper paste or carbon black paste. The light sources 61c, e.g., LED dice or LED dice encapsulated by encapsulant, are wire bonded or flip chip bonded to electrically connect with the electrode layers 61b on the two opposite surfaces of the substrate 61a.

The light spreading plates 63, which are same as the light spreading plates 13 in the first embodiment, comprises a light traveling layer 63a, a light scattering layer 63b, and a plurality of through hole 63c. The light spreading plates 63 are disposed on the two opposite surfaces of the light source module 61 in a double-side lighting spreading configuration. The light source module 61 is further formed with through holes 61e. Each of the through holes 61e is used for the hollow cap 65 and stick cap 67 connected therethrough to fix the light spreading plates 63 onto the two opposite surfaces of the light source module 61. In this way, the light spreading plates 63 could be secured onto the opposite surfaces of the light source module 61 when the stick caps 67 are connected to the hollow caps via the through holes 61e of the light source module 61 and the through holes 63c of the light spreading plates 63, respectively. Each of the hollow caps 65 has an extending hole to receive the stick cap 67. Both of the hollow cap 65 and the stick cap 67 can be made of a transparent or translucent plastic material such as silicon rubber, polyurethane, polystyrene, polyester, polycarbonate, polyimide, polyacrylic resin, PMMA, ABS, PVC, PE, PP or a combination thereof.

The two light diffuser plates 69a, 69b are similar to the light diffuser plates 17 in the first embodiment. The light diffuser plates 69a, 69b of the lighting device 6 are respectively disposed above and under the light spreading plates 63 on the two opposite sides of the light source module 61. The hollow caps 65 and the stick caps 67 act as spacers to support the light diffuser plate 69a from the light spreading plates 63 on top surface of the light source module 63 with a specific distance, and to support the light diffuser plate 69b from the light spreading plates 63 at bottom surface of the light source module 61 with the specific distance.

Figure 7A:
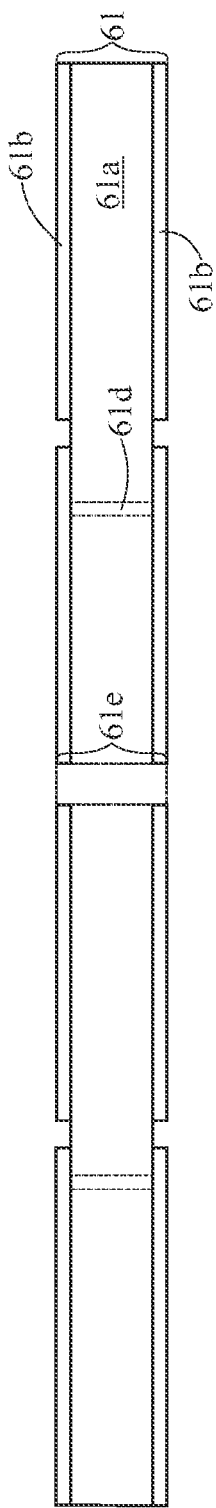
Figure 7B:
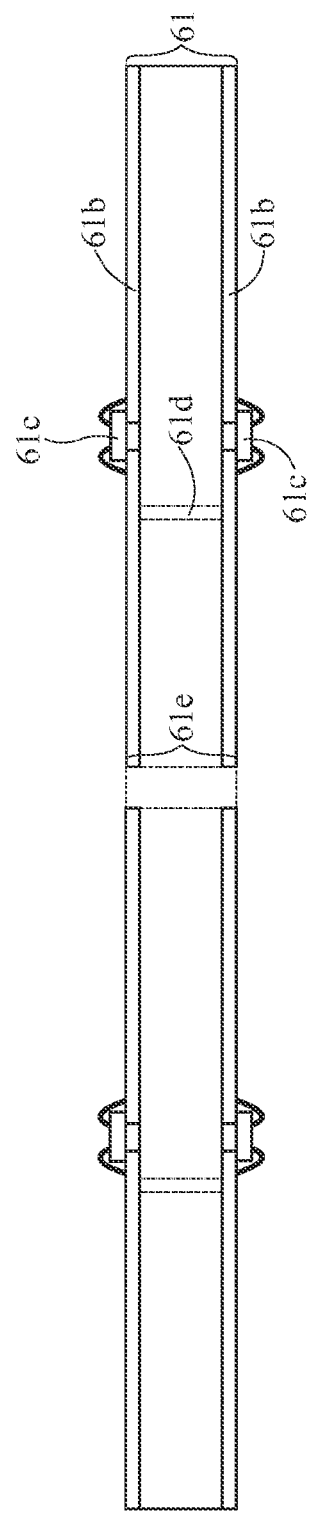
Figure 7C:
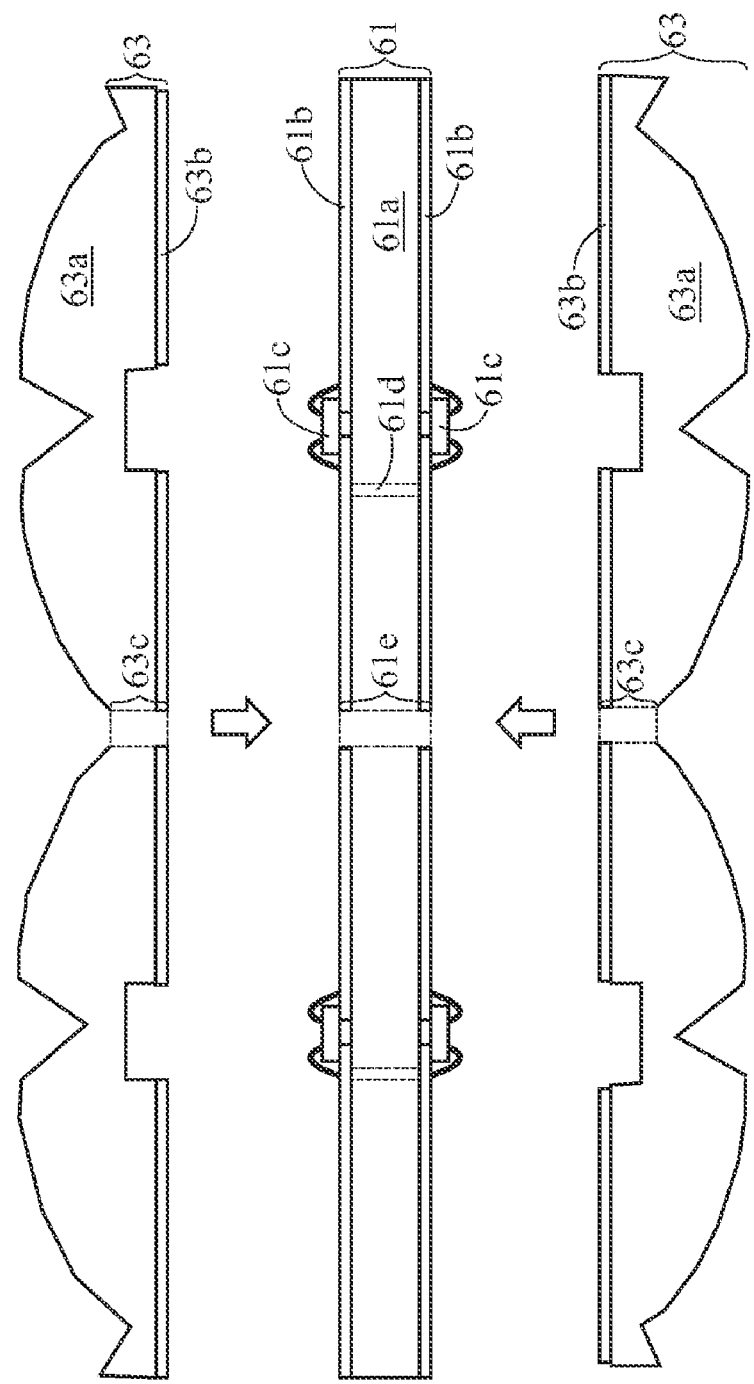
Figure 7D:
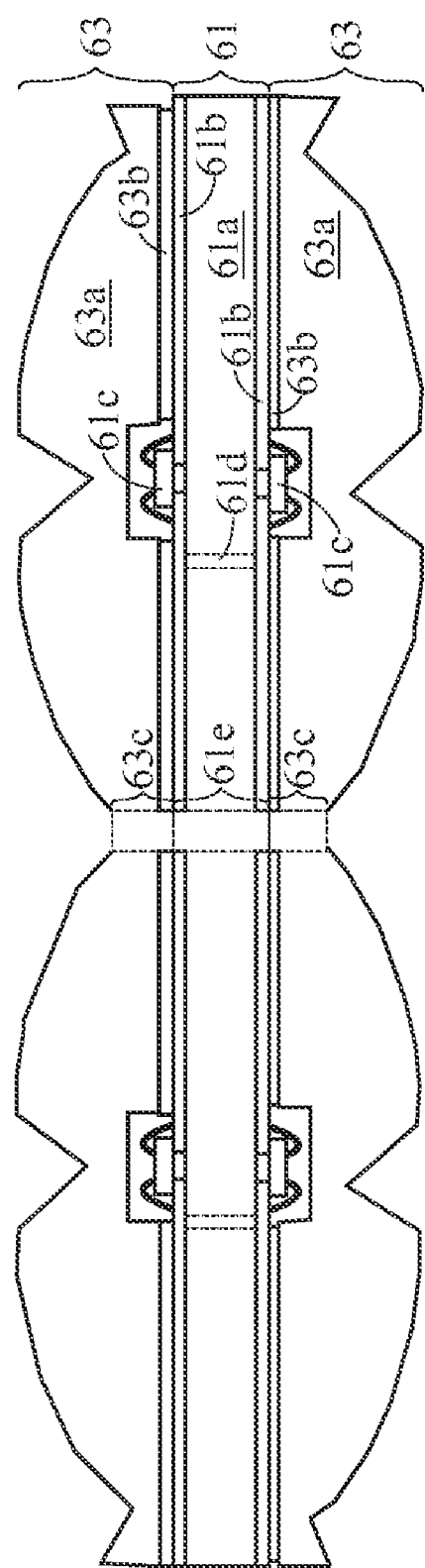
Figure 7F:
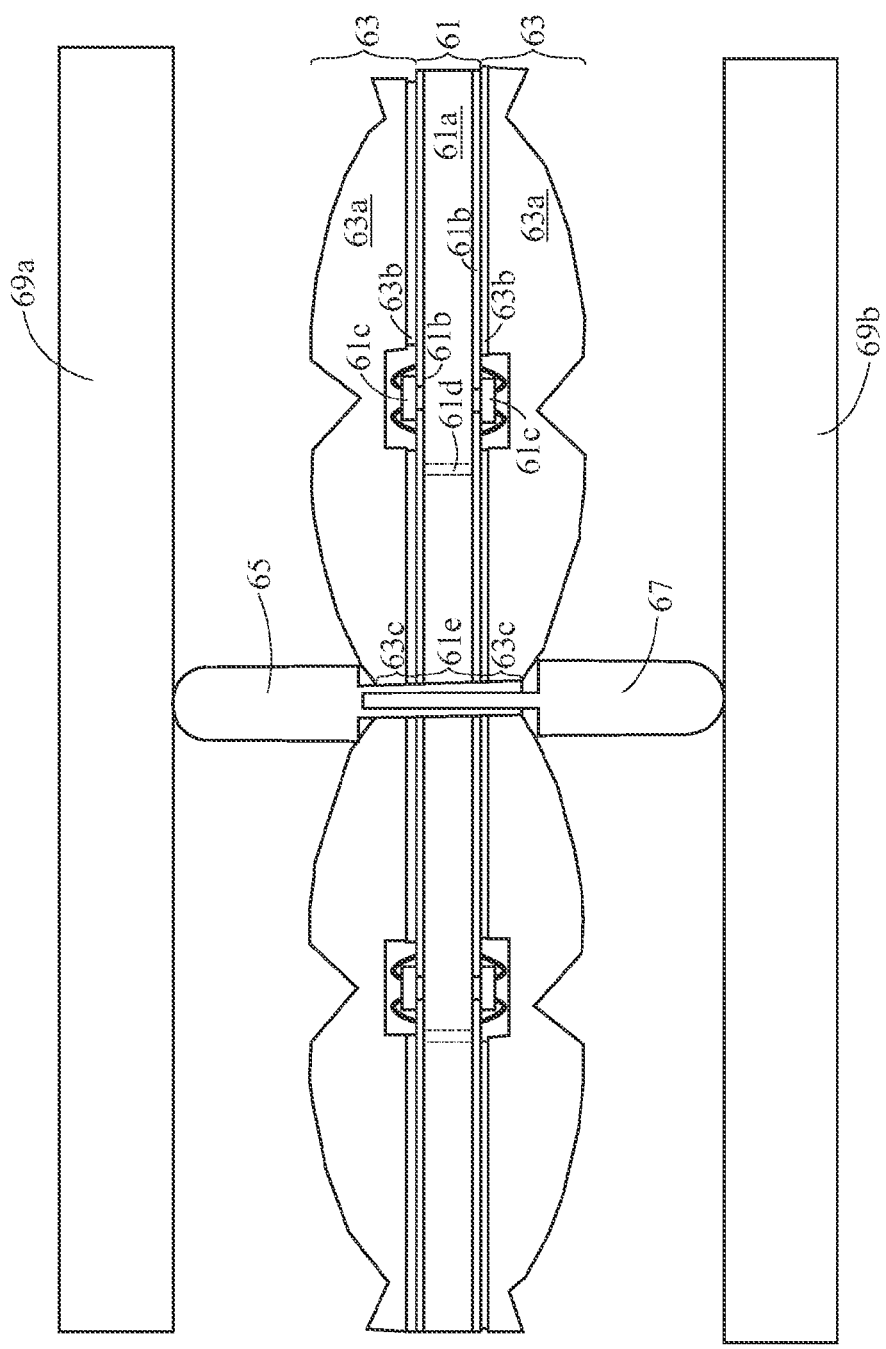

The sixth embodiment of the present invention relates to a method for manufacturing the lighting device 6 of the fourth embodiment. First, as shown in FIG. 7A to FIG. 7B, the light source module 61 is provided. The substrate 61a of the light source module 61 is formed with the through holes 61e, and the electrode layers 61b are patterned onto two opposite surfaces, the top surface and the bottom surface, of the substrate 61a to electrically connect with each other through the via hole 61d. As shown in FIG. 7B, the light sources 61c, e.g., LED dice encapsulated with encapsulant, are bonded onto the electrode layers 61b on the two opposite surfaces of the substrate 61a. The light source module 61 is characterized in that a plurality of through holes 61e are formed at the particular area thereof. In FIG. 7C to FIG. 7D, the light spreading plates 63 comprising a light travel layer 63a coated with a light scattering layer 63b on the bottom surface thereof and the through holes 63c are provided. When the light spreading plates 63 are disposed onto the two opposite surfaces of the light source module 61, the through holes 61e of light source module 61 are aligned with the through holes 63c of the light spreading plate 63. In FIG. 7E, the hollow caps 65 are connected to the stick caps 67 via the through holes 61e of the light source module 61 and the through holes 63c of the light spreading plates 63 to secure the light spreading plates 63 onto the two opposite surfaces of the light source module 61. Finally, as shown in FIG. 7F, the two light diffuser plates 69a, 69b are respectively disposed above the light spreading plates 63 on the two opposite surfaces of the light source module 61. The light diffuser plate 69a is supported by the hollow caps 65 to be spaced apart from the light spreading plates 63 with a specific distance, and the light diffuser plate 69b is supported by the stick caps 67 to be spaced apart from the light spreading plates 63 with the specific distance.

Figure 8:
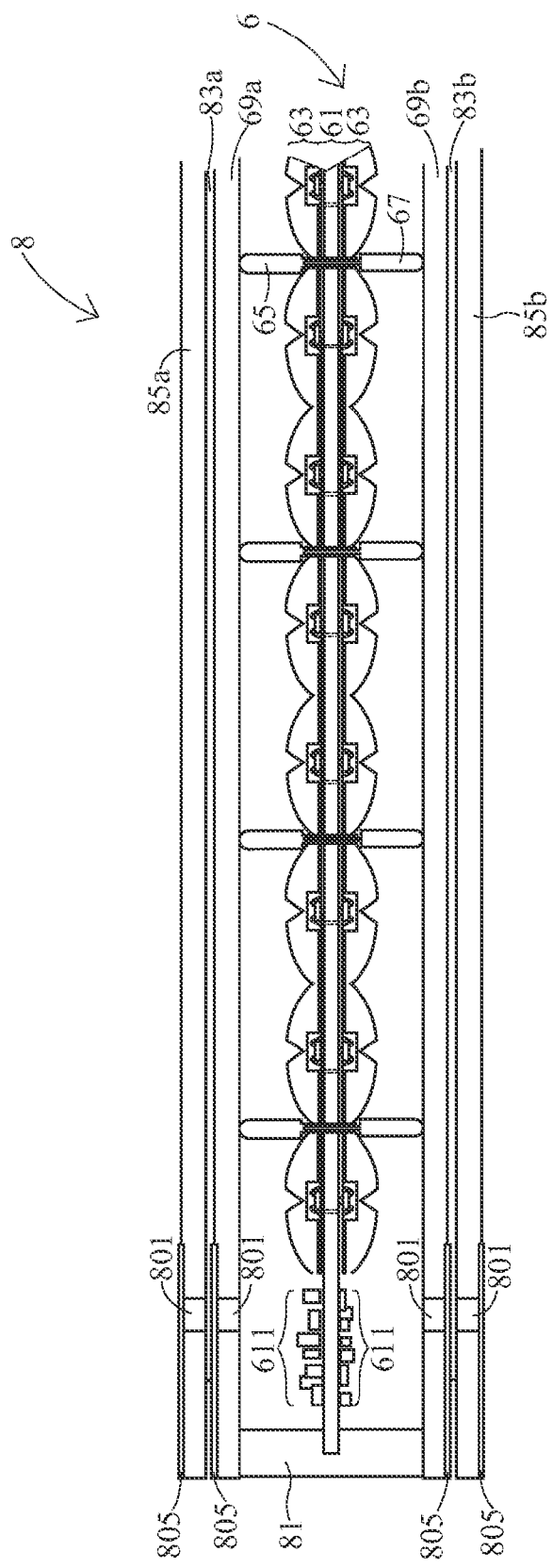
FIG. 8 is a schematic view illustrating a light box which uses the lighting device in fifth embodiment of the present invention.

FIG. 8 is a schematic view illustrating a light box 8 using the lighting device 6 to form a double-side direct lit backlight module in the fourth embodiment of the present invention. The light box 8 has a side frame 81 being formed with a trench for receiving the substrate 61 so that the lighting device 6 can be fastened in the light box 8. The light diffuser plates 69a, 69b of the lighting device 6 are then assembled or glued to the side frame 81 and supported by the hollow caps 65 and the stick caps 67. Thus, the light diffuser plates 69a, 69b can be disposed on the two opposite sides of the light spreading plates 63. The light box 8 also has two translucent films 83a, 83b, such as a slides printed with pictures, respectively disposed onto the light diffuser plates 69a, 69b. Preferably, the light box 8 further has two protective films 85a, 85b which are made of transparent acryl material and disposed onto the two translucent films 83a, 83b respectively. Moreover, the protective films 85a, 85b and the light diffuser plates 69a, 69b can be attached with each other through the magnetic buttons 801. The translucent films 83a, 83b are adapted to be secured therebetween. Thus, light generated from the double-side lighting device 6 can be emitted out the light box 8 through the translucent films 83a, 83b and the protective films 85a, 85b.

It is noted that the lighting device 6 also comprise electrical components 611 for driving the lighting device 6. The light box 8 can further has masking layers 805 which are formed by coating the protective films 85a, 85b and the light diffuser plates 69a, 69b to shelter the connector 803 underneath and provide sharper edge images. The masking layers 805 can be black or any other opaque color. It is noted that the translucent films 83a, 83b and the protective films 85a, 85b can be removed from the light box 8 to form a double-sided lighting module which can be used for general lighting or backlight module applications. Conceivably, if the lighting device 6 is used for the light box 5 and the light box 5 has two protective films 531 on the top and bottom sides of the rectangle-shaped housing 53, another double-side direct lit backlight module is formed.

Figure 9:
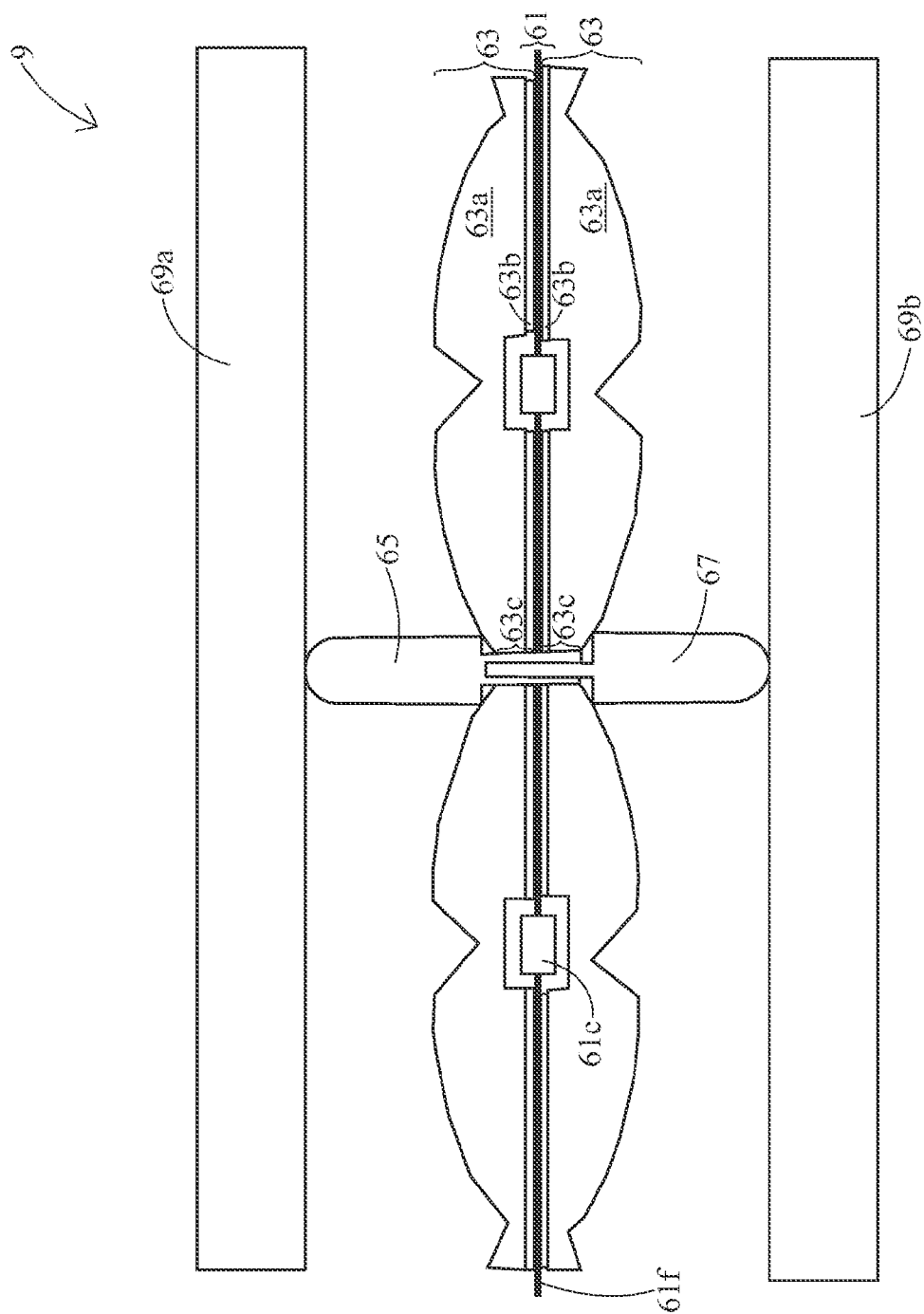
FIG. 9 is a schematic view illustrating a double-side lighting device in accordance with the seventh embodiment of the present invention.

FIG. 9 illustrates the cross-sectional view of a part of a double-side lighting device 6 of the fifth embodiment of the present invention. In this embodiment, the source module 61 is constructed by the light sources 61c and a plurality of electrical wires 61f. The light sources 61c are connected via the electrically wires 61f.

Given the above, direct-lit lighting devices and methods for manufacturing the direct-lit lighting devices are disclosed. Both the direct-lit lighting device and the double-side direct-lit lighting device are suitable for large-scale display products. The lighting devices having the light spreading plates with the light spreading plate are able to produce a uniform surface light within an ultra thin configuration.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A lighting device, comprising:
   a light source module having a substrate, an electrode layer patterned on the substrate, and a plurality of light sources bonded on the substrate to electrically connect with the electrode layer;
   a plurality of light spreading plates being disposed onto the light source module, each of the light spreading plates having a light traveling layer formed with a plurality of light spreading units, a light scattering layer coated onto the light traveling layer, and a plurality of through holes, wherein each of through holes is formed at a periphery of one of the light spreading units;
   a plurality of stick objects being disposed at the substrate and protruding the through holes respectively; and
   a plurality of hollow caps, each of the hollow caps having a hole to receive one of the stick objects so that the light spreading plates are secured onto the light source module when the stick objects penetrate the through holes to be sheathed with the hollow caps respectively.

2. The lighting device as claimed in claim 1, further comprising a light diffuser plate being disposed above the light spreading plates and supported by the hollow caps to space apart from the light spreading plates with a specific distance.

3. The lighting device as claimed in claim 1, further comprising a light diffuser plate being disposed above the light spreading plates and supported by the stick objects to space apart from the light spreading plates with a specific distance.

4. The lighting device as claimed in claim 1, wherein each of the light spreading units has a main body being defined with a top surface, a bottom surface and a peripheral, and the main body has a thickness being tapered towards the peripheral, wherein the top surface is formed with a first recess, the bottom surface is formed with a second recess opposite to the first recess, and the second recess is utilized to accommodate one of the light sources.

5. The lighting device as claimed in claim 4, wherein the main body is a dome-shaped body.

6. The lighting device as claimed in claim 4, wherein each of the first recesses is a cone-shaped recess.

7. The lighting device as claimed in claim 1, wherein the top surface of each of the light spreading units is a matt surface.

8. The lighting device as claimed in claim 1, wherein the substrate is a printed circuit board (PCB) or a flexible printed circuit board.

9. The lighting device as claimed in claim 1, wherein each of the light sources is an encapsulant enclosing at least one LED die, the at least one LED die is selected from a group consisting of a red LED die, a green LED die, a blue LED die, a amber LED die and a UV LED die.

10. The lighting device as claimed in claim 1, wherein the light traveling layer of each of the light spreading plates is made of a polymeric material selected from a group consisting of silicon rubber, polyurethane, polystyrene, polyester, polycarbonate, polyimide, polyacrylic resin, polymethylmethacrylate (PMMA), acrylonitrile butadiene styrene (ABS), polyvinylchloride (PVC), polyethylene (PE) and polypropylene (PP).

11. The lighting device as claimed in claim 1, wherein the stick objects are made of a metal material and a plastic material.

12. The lighting device as claimed in claim 1, wherein the hollow caps are made of a transparent plastic material or a translucent plastic material.

13. The lighting device as claimed in claim 1, wherein the stick objects are soldered on a surface of the substrate.

14. The lighting device as claimed in claim 1, wherein the light source module is further formed with a plurality through holes and each of the stick objects has a stopper at a bottom end thereof, wherein the stick objects further penetrate the through holes of the light source module for the stoppers being stuck at the light source module.

15. A lighting device, comprising:
a light source module having a plurality of light sources;
a plurality of light spreading plates being disposed onto two opposite surfaces of the light source module, each of the light spreading plate having a light traveling layer formed with a plurality of light spreading units, a light scattering layer coated onto the light traveling layer, and a plurality of through holes, wherein each of the through holes is formed at a periphery of one of the light spreading units;
a plurality of stick caps; and
a plurality of hollow caps, each of the hollow caps having an extending hole for receiving one of the stick caps so that the light spreading plates are secured onto the opposite surfaces of the light source module when the stick caps are connected to the hollow caps via the through holes of the light spreading plates, respectively.

16. The lighting device as claimed in claim 15, wherein the light source module further comprises a substrate, an electrode layer patterned on two opposite surface of the substrate, and a plurality of first through holes, the light sources are bonded onto the two opposite surface of the substrate to electrically connect with the electrode layer, and the stick caps are connected to the hollow caps further via the through holes of the light source module, respectively.

17. The lighting device as claimed in claim 16, wherein the substrate is a printed circuit board (PCB) or a flexible printed circuit board.

18. The lighting device as claimed in claim 15, wherein the light source module further comprises a electrical wires, and the light sources are connected via the electrically wires.

19. The lighting device as claimed in claim 15, further comprising two light diffuser plates, one of the light diffuser plates being disposed above the light spreading plates on one of the opposite surfaces of the light source module and supported by the hollow caps to space apart from the light spreading plates with a specific distance, and the other one of the light diffuser plates being disposed above the light spreading plates on the other one of the opposite surfaces of the light source module and supported by the stick caps to space apart from the light spreading plates with the specific distance.

20. The lighting device as claimed in claim 15, wherein each of the light spreading units has a main body being defined with a top surface, a bottom surface and a peripheral, and the main body has a thickness being tapered towards the peripheral, wherein the top surface is formed with a first recess, the bottom surface is formed with a second recess opposite to the first recess, the second recess is utilized to accommodate one of the light sources.

21. The lighting device as claimed in claim 20, wherein the main body is a dome-shaped body.

22. The lighting device as claimed in claim 20, wherein each of the first recesses is a cone-shaped recess.

23. The lighting device as claimed in claim 20, wherein the top surface of each of the light spreading units is a matt surface.

24. The lighting device as claimed in claim 15, wherein each of the light sources is an encapsulant enclosing at least one LED die, the at least one LED die is selected from a group consisting of a red LED die, a green LED die, a blue LED die, a amber LED die and a UV LED die.

25. The lighting device as claimed in claim 15, wherein the light traveling layer of each of the light spreading plates is made of a polymeric material selected from a group consisting of silicon rubber, polyurethane, polystyrene, polyester, polycarbonate, polyimide, polyacrylic resin, polymethylmethacrylate (PMMA), acrylonitrile butadiene styrene (ABS), polyvinylchloride (PVC), polyethylene (PE) and polypropylene (PP).

26. The lighting device as claimed in claim 15, wherein the stick caps and the hollow caps are made of a transparent plastic material or a translucent plastic material.

* * * * *

UNITED STATES PATENT AND TRADEMARK OFFICE
CERTIFICATE OF CORRECTION

PATENT NO. : 8,313,206 B2
APPLICATION NO. : 12/963674
DATED : November 20, 2012
INVENTOR(S) : Wei-Hsin Hou et al.

It is certified that error appears in the above-identified patent and that said Letters Patent is hereby corrected as shown below:

Title Page, insert Item (73):

--(73) Assignee: LUXINGTEK, LTD., Zhubei City, Hsinchu County, Taiwan--

Signed and Sealed this
Fifteenth Day of October, 2013

Teresa Stanek Rea
*Deputy Director of the United States Patent and Trademark Office*